April 1, 1941.　　　R. L. TWEEDALE　　　2,237,018
POWER TRANSMISSION
Filed Feb. 11, 1937　　　6 Sheets-Sheet 1

INVENTOR
Ralph L. Tweedale

April 1, 1941.  R. L. TWEEDALE  2,237,018
POWER TRANSMISSION
Filed Feb. 11, 1937  6 Sheets-Sheet 4

INVENTOR
Ralph L. Tweedale

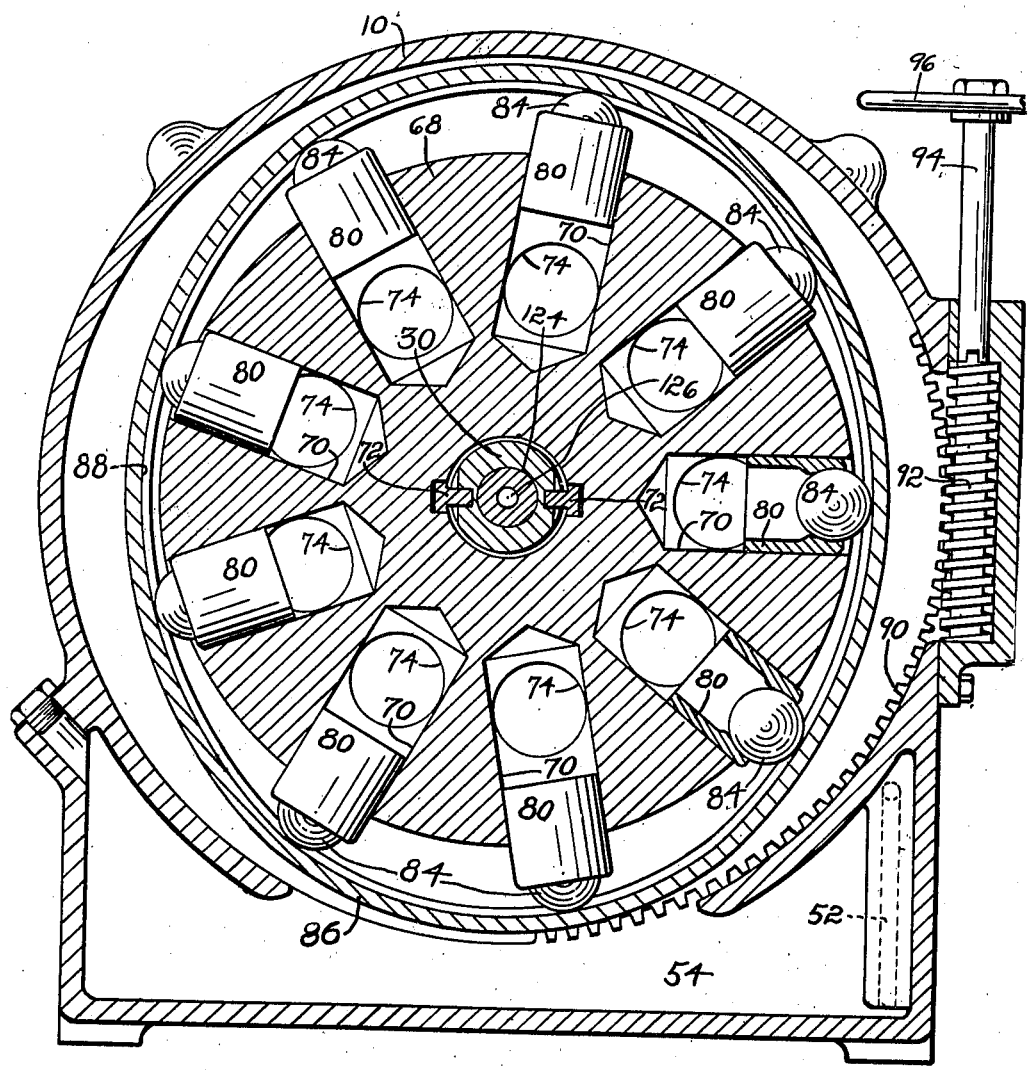

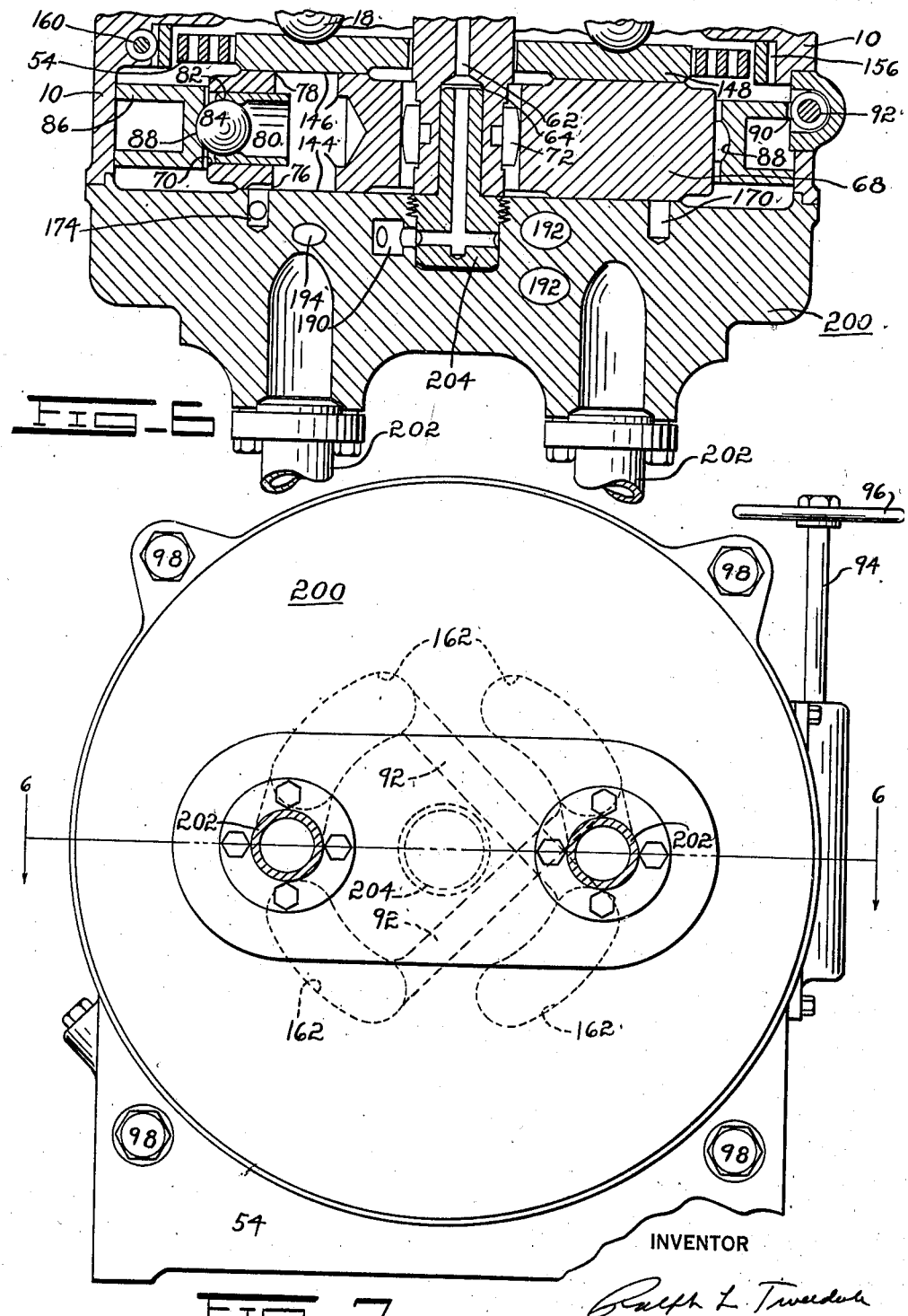

Patented Apr. 1, 1941

2,237,018

UNITED STATES PATENT OFFICE 2,237,018

POWER TRANSMISSION

Ralph L. Tweedale, Waterbury, Conn., assignor to The Waterbury Tool Company, Waterbury, Conn., a corporation of Connecticut Application February 11, 1937, Serial No. 125,252

9 Claims. (Cl. 60—53)

This invention relates to power transmissions and more particularly to those of the type comprising two or more fluid pressure energy translating devices, one of which may function as a pump and another as a fluid motor. Devices of this character are usually constructed as a separate unit for connection to a prime mover and to a load device.

It is an object of the present invention to provide a power unit comprising an electric motor prime mover and a variable speed power transmission which is constructed as a single compact unit making use of the available space in the most economical manner, and providing an efficient and reliable supply of mechanical power at any speed desired.

A further object is to provide such a unit by which certain standard sections of the unit may be assembled together in different combinations to provide a power unit suitable for many different requirements as well as to provide for assembling a motor driven variable displacement pump from the same standard parts which go to make up a variable speed power unit.

Another object of the invention is to provide a power transmission in which simple and effective means are utilized for automatically maintaining the proper clearance at the rotary valving surfaces.

A further object is to provide a fluid pressure energy translating device in which the fluid pressure forces are balanced both radially and axially and wherein the effective displacement may be varied by altering the phase relation of the valve action with respect to the piston action and to provide therein means for compensating certain disturbances of the valve action at small effective displacements.

Further objects and advantages of the present invention will be apparent from the following description, reference being had to the accompanying drawings wherein a preferred form of the present invention is clearly shown.

In the drawings:

Fig. 5 is a cross section on line 5—5 of Fig. 1.

Fig. 6 is a cross section on line 6—6 of Fig. 7.

Fig. 7 is an end view showing the invention embodied in a variable displacement pump.

Figure 1:
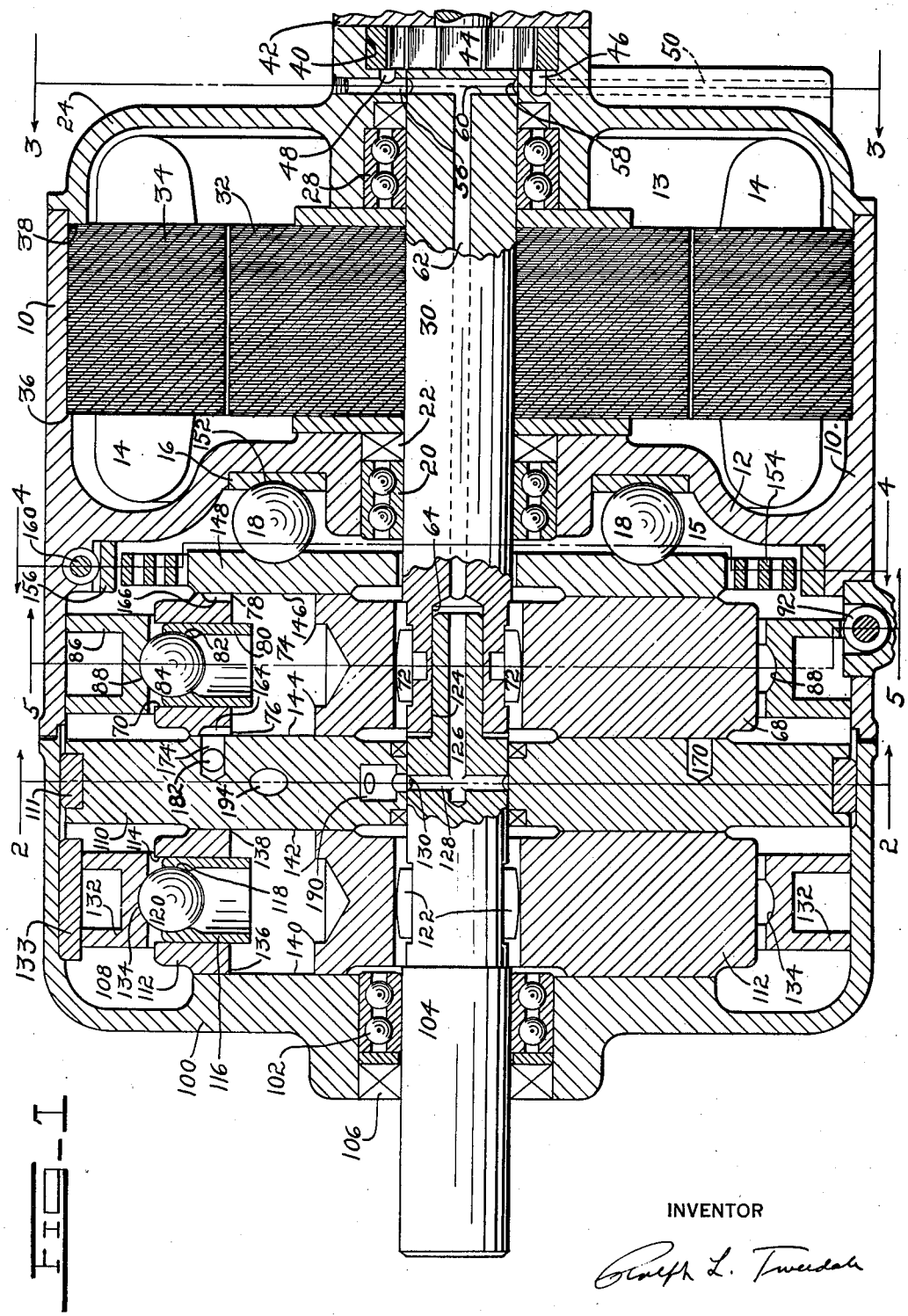
Fig. 1 is a longitudinal cross section of a motor-transmission unit incorporating a preferred form of the present invention.

Referring now to Fig. 1 the novel motor-transmission unit comprises a main frame section 10 which is of generally tubular shape with a transverse partition 12 extending across the same, near the mid point. The partition 12 divides the casing member 10 into a motor compartment 13 on the right, and a pump compartment 15 on the left. The partition 12 is dished as shown in Fig. 1 to provide space for the motor windings 14 on the right-hand side of the partition and to provide a space on the left-hand side of the partition and radially inward for race 16 and balls 18, later to be described. The partition 12 is further provided with a central bore within which are mounted bearings 20 and an oil seal 22. An end plate 24 is secured to the casing member 10 by bolts 26 and has a central bore in which are mounted bearings 28. A shaft 30 is journalled in the bearings 20 and 28 and carries an electric motor rotor 32 of any suitable construction. A stator 34 carries the windings 14 and is positioned between a shoulder 36 on the casing 10 and a shoulder 38 on the end plate 24.

Figure 3:
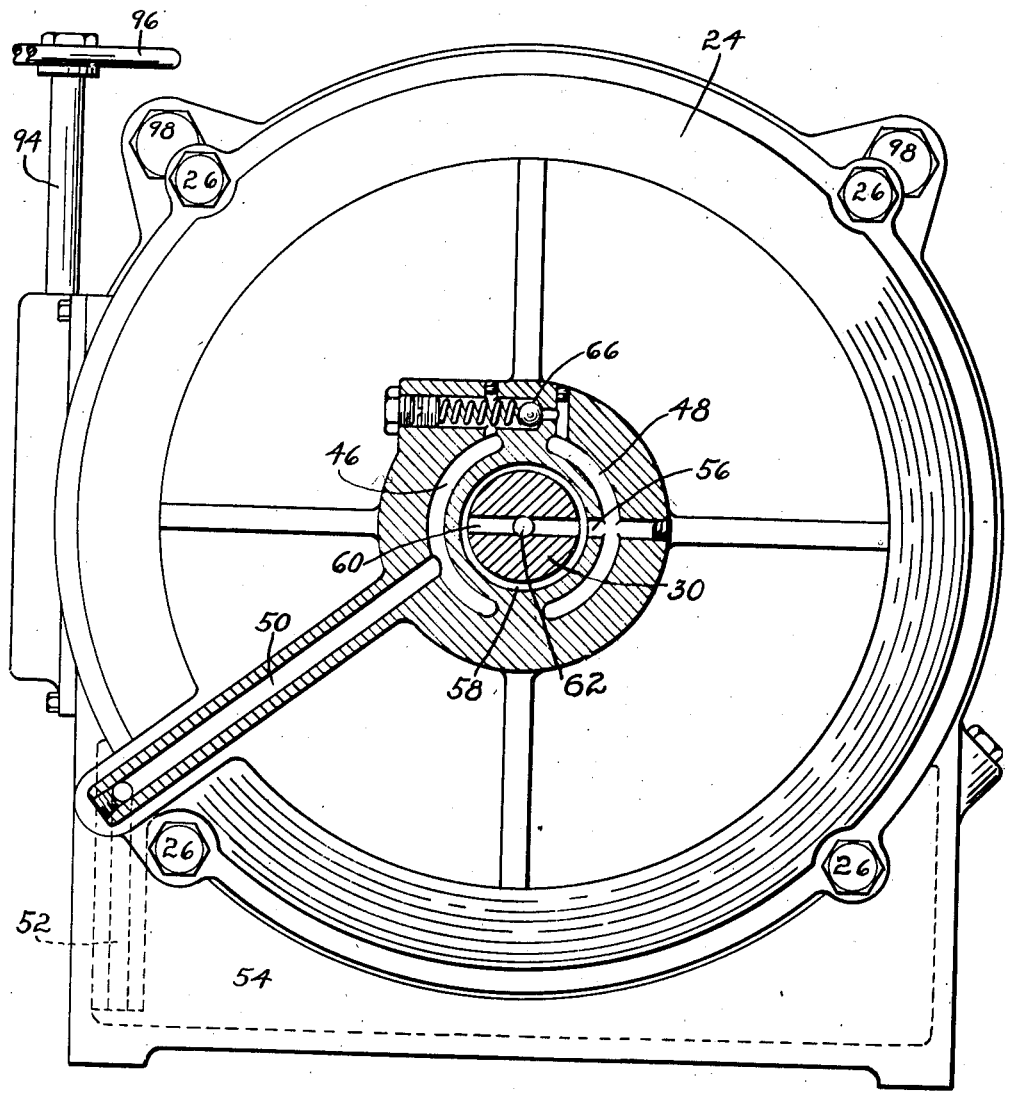
Fig. 3 is a cross section on line 3—3 of Fig. 1.
Figure 4:
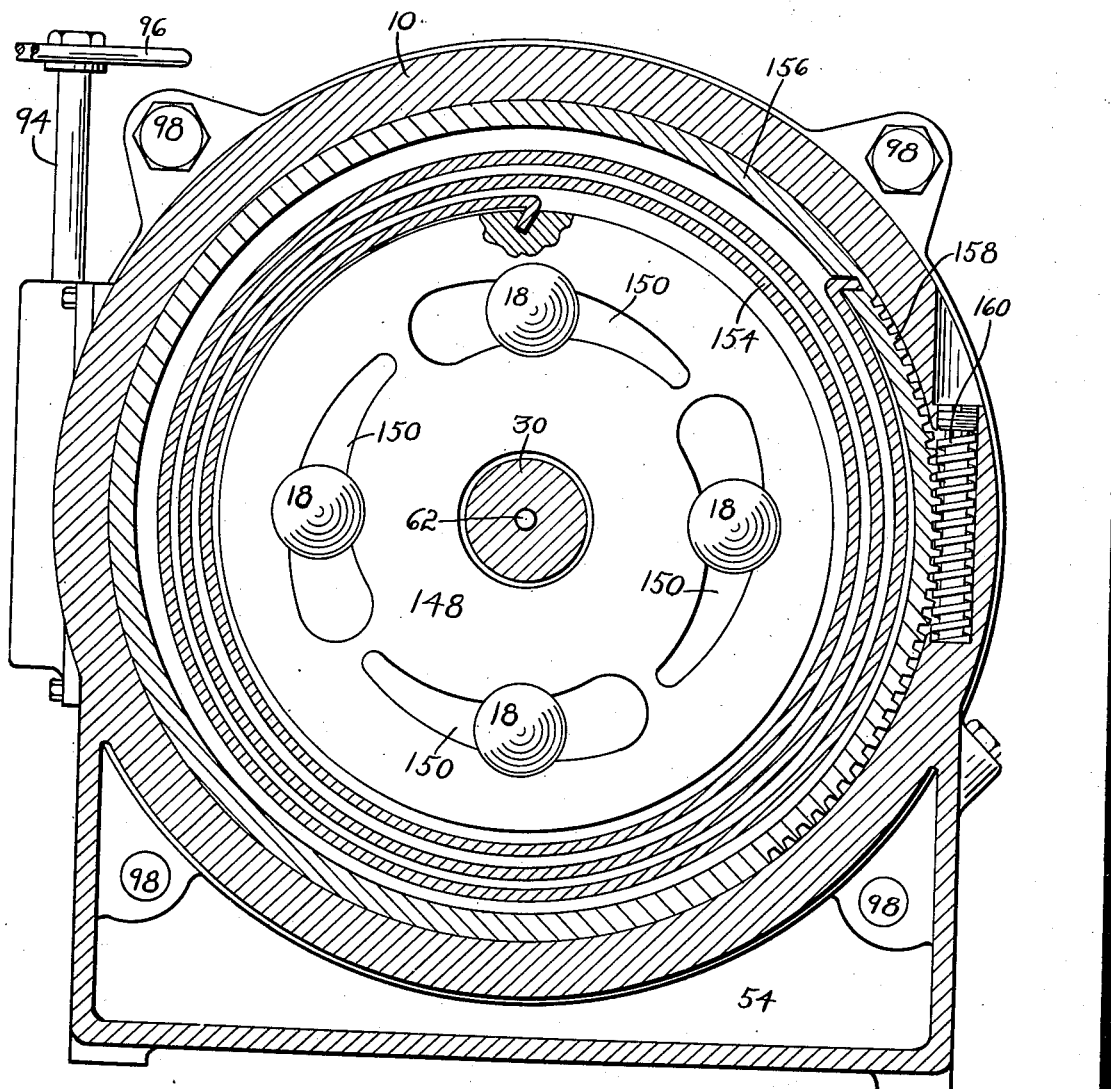
Fig. 4 is a cross section on line 4—4 of Fig. 1.

The end plate 24 is provided with a cylindrical recess 40 closed by an end cap 42. Within the recess 40 is mounted a small fixed displacement pump 44 which is illustrated as of the internal-external gear type. Suitable arcuate inlet and outlet ports 46 and 48 are provided adjacent the recess 40 (see Fig. 3). The inlet port 46 communicates by a passage 50 formed in the end plate 24 and a passage 52 formed in the frame member 10 with a sump 54 which is formed integrally with the frame member 10 at the bottom thereof as is apparent from Fig. 4. The sump 54 is separated from the motor compartment 13 but opens into the pump compartment 15 on the left-hand side of the partition 12. The outlet port 48 of the pump 44 communicates by a passage 56 with a groove 58 formed in the shaft 30. A transverse bore 60 and longitudinal bore 62 serve as delivery passages to a larger bore 64 formed in the left-hand end of the shaft 30. A suitable relief valve 66 serves to by-pass fluid from the port 48 to the port 46 when a predetermined pressure is exceeded in the port 48.

Within the pump compartment 15 there is mounted on the shaft 30 a cylinder barrel 68 having a plurality of radial cylinders 70 formed therein. The barrel 68 is connected to the shaft 30 by pivoted keys 72 which permit a limited universal joint action between the shaft 30 and the barrel 68 to provide for slight inaccuracies in alignment. Communicating with each cylinder 70 at the inner end thereof is a longitudinal bore 74 extending from side to side of the barrel 68 providing individual oppositely facing cylinder ports 76 and 78. Within each cylinder 70 is slidably mounted a sleeve-like piston member 80 having a partially spherical socket 82 in which a ball 84 is permanently secured to provide a freely rolling fit between the ball and the sleeve. Slidably and rotatably mounted in the casing member 10 is a race member 86 having a generally oval race 88 on which the balls 84 may roll. The race 88 is preferably formed with a cross section corresponding to the curvature of the balls 84. The race member 88 is provided with teeth 90 on a portion of its outer periphery which cooperate with a worm 92 to vary the angular position of the oval race 88. A shaft 94 and handwheel 96 permit manual operation of the worm 92.

Secured to the casing section 10 at the lefthand end thereof by bolts 98 is an end plate 100. The latter carries central bearings 102 on which a shaft 104 is journalled, an oil seal 106 being provided to prevent the escape of oil along this shaft. The end plate 100 provides a fluid motor chamber 108 and serves also as a mounting for a valve plate 110 which is slidably but non-rotatably secured to the interior of the end plate 100 by keys 111. In the motor chamber 108 is a second cylinder barrel 112 similar to the cylinder barrel 68 having cylinders 114 in which are slidably mounted, piston sleeves 116 having spherical sockets 118 to receive balls 120. The barrel 112 is secured to the shaft 104 by keys 122 similar to the keys 72. The shaft 104 is journalled in the valve plate 110 and has its end reduced in diameter at 124 to be received in the enlarged bore 64 of the shaft 30. A central passage 126 and cross bore 128 connect a groove 130 on the shaft 104 with the delivery passage 62 of the pump 44.

The end plate 100 also supports a race member 132 having an oval race 134 similar to the race 88. The race member 132 is mounted so as to be axially slidable but non-rotatable with respect to the end plate 100 by means of keys 133. Each of the cylinders 114 of the barrel 112 is provided with individual cylinder ports 136 and 138 similar to the ports 76 and 78.

The cylinder barrel 112 is provided with flat faces which abut a flat face 140 formed on the end plate 100 and a flat face 142 on the valve plate 110. The cylinder 68 is likewise formed with flat faces which abut against a flat face 144 on the valve plate 110 and a flat face 146 formed on a reaction member 148. The right-hand face of the reaction member 148 is provided with a plurality of cam races 150, (Fig. 4) each of which forms a small portion of a helix formed to fit the balls 18. The balls 18 are disposed between the cam tracks 150 and a toroidal race 152 formed in the race member 16. Secured to the reaction plate 148 is a spiral spring 154 which has its other end secured to an adjustable ring 156 mounted in the casing member 10. The ring 156 is provided with teeth 158 which engage with a worm 160 by which the angular position of the ring 156 may be adjusted.

Figure 2:
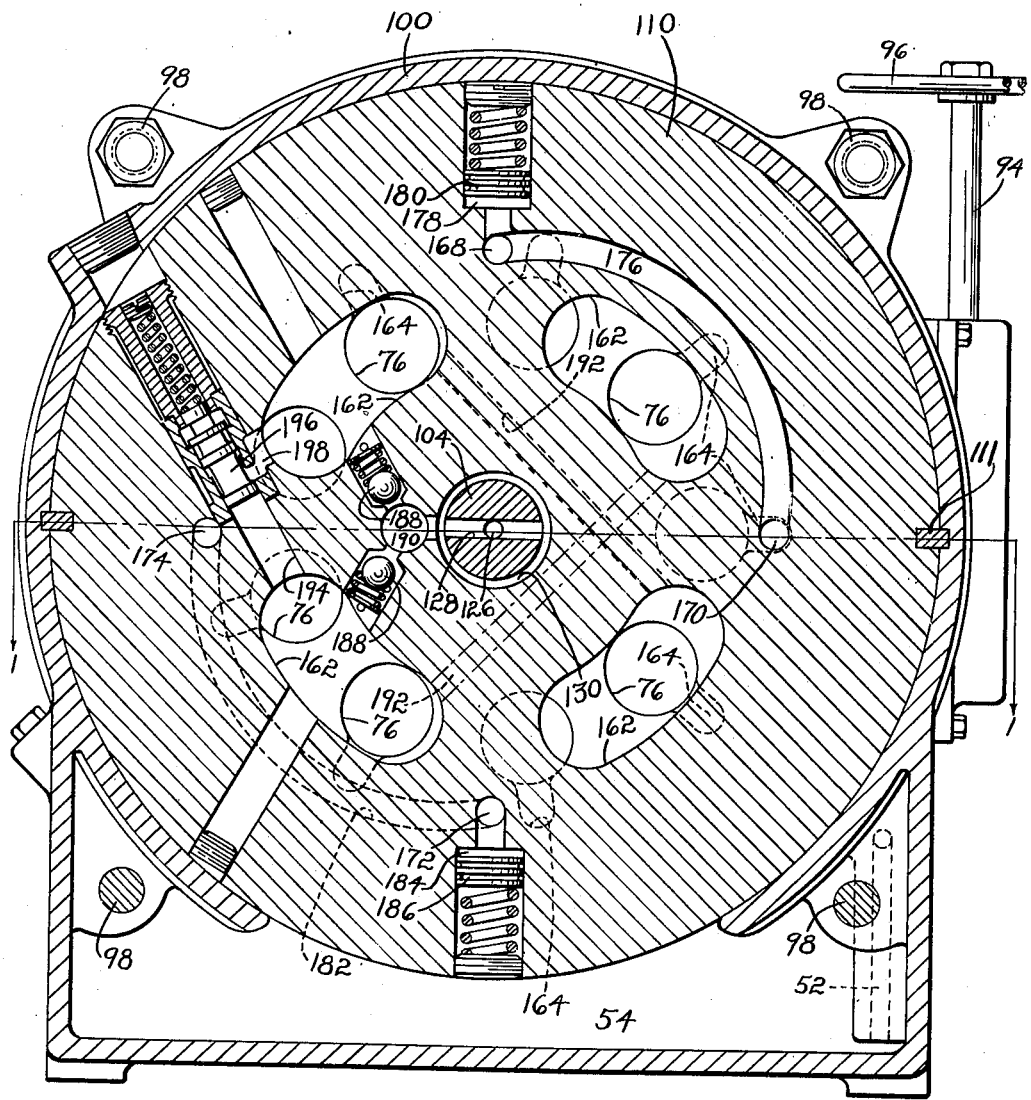
Fig. 2 is a cross section on line 2—2 of Fig. 1.

Referring now to Fig. 2 the construction of the valve plate 110 is there illustrated. It will be seen that there are provided four arcuate passages 162 extending transversely through the plate from the surface 142 to the surface 144 and cooperating with the cylinder ports 76 and 138. The cylinder barrel 68 is provided with port extensions 164 adjacent the ports 76, and with similar port extensions 166 adjacent the ports 78. The port extensions 164 are adapted to cooperate with passages 168, 170, 172 and 174 which lead into the valve plate from the surface 144. The passages 168 and 170 are connected by a passage 176 and communicate with a cylinder 178 in which is a spring-loaded piston 180. The passages 172 and 174 are connected similarly by a passage 182 and communicate with a cylinder 184 having a spring-pressed piston 186. Each of the passages 168, 170, 172 and 174 is positioned equidistantly between the main valve ports 162 but radially outward therefrom. Also within the valve plate are mounted replenishing valves 188 which communicate with a passage 190 leading from the groove 130. The valves 188 open into two adjacent ports 162. The diametrically opposite ports 162 are connected by transverse passages 192. One of the ports 162 communicates by a bore 194 with a relief valve 196 which is adapted to open communication with the adjacent port 162 through a passage 198 whenever the pressure in either port 162 exceeds a predetermined value.

In operation assuming the active part of the system, that is the cylinders 70 and 114 and the valve ports, to be filled with oil and with a suitable quantity of oil in the sump 54, rotation of the shaft 30 by the motor 32—34 drives the barrel 68 causing the balls 84 to be carried around the oval track 88. The pistons 80 are thereby reciprocated alternately in and out at the rate of four strokes per revolution. With the race member 86 positioned as illustrated in Fig. 5, it will be seen that each piston stroke begins as a port 76 passes on to one of the valve ports 162 and ends as the port 76 passes off from the valve port 162. Two opposite ports 162 thus supply fluid to the cylinders 70 on the outward stroke of the piston while the pistons deliver fluid to the other two ports 162 on their inward strokes. The cylinder barrel 112 receives this fluid delivered from the pump through two of the ports 162 and the pressure is exerted on pistons 116 and balls 120, causing the barrel 112 to turn at the same speed as the barrel 70. On the inward strokes of the pistons 116, oil is returned to the pump through the other two ports 162. For example if the barrel is rotated clockwise in Fig. 5, pistons 80 will move in during their travel through the upper right and lower left quadrants and fluid will be delivered to the ports 162 located in these quadrants. Likewise the pistons 80 will move out during their travel through the upper left and lower right quadrants and oil will be withdrawn from the ports 162 located in those quadrants. Thus under these conditions the ports 162 at the upper right and lower left quadrants become the pressure ports while the other ports 162 become the suction ports.

The reaction plate 148 is urged by the spring 154 to turn in a direction opposite to that in which the shaft 30 turns. This action causes the plate 148 to roll on the balls 18 toward the shallow ends of the track 150. The plate 148 is thus urged by a screw action to the left in Fig. 1 until the flat surfaces of the cylinder barrels, the valve plate and the casing 100 are urged into sealing relationship. This action continues until the frictional drag of the barrel 68 on the plate 148 is equal to the force exerted by the spring 154 when a balance is reached such that the plate 148 is maintained stationary. As conditions change requiring a different position of the plate 148, the plate adjusts itself automatically to the point where the frictional drag exactly balances the force of the spring 154. Thus, changes in oil viscosity and wear on the flat surfaces of the various members are compensated for automatically and independently of the fluid pressure at which the unit operates. The axial forces on the barrels 68 and 112 are balanced by the balancing ports 78 and 136 which are exactly symmetrical with ports 76 and 138 respectively. The radial forces on the barrels 68 and 70 and on the bearings 20 and 102 are balanced by the fact that for each piston there is another piston diametrically opposite which is moving oppositely.

The speed and direction of the shaft 104 may be varied by changing the position of the race member 86. Thus by operation of the handwheel 96 if the race be turned counterclockwise in Fig. 5 through an angle less than 45°, the phase relation between the piston strokes and the valve action at the ports 162 is altered so that during a portion of the inward stroke of each piston fluid is delivered to the ports 162 which are on the suction side and likewise during a portion of the outward stroke of each piston, fluid is withdrawn from the ports 162 which are on the delivery side. The farther the race 86 is turned away from the full discharge position of Fig. 5, the longer is each piston connected to the wrong port during a part of each stroke, until, when the 45° position is reached, the transfer from one port 162 to the next occurs exactly at mid stroke of each piston. At this position the net displacement is zero. Upon further rotation counterclockwise the net displacement increases but the direction of flow through the ports 162 is reversed, thus reversing the shaft 104. After 90° movement of the race 86 from the position of Fig. 5, the pump displaces the maximum quantity of fluid in the reverse direction.

It will be seen that at any setting of the handwheel 96 other than the two full displacement positions, each piston is moving either inwardly or outwardly as its corresponding port 76 passes across the blank face 144 between adjacent ports 162. In order to relieve the fluid which is displaced during this instant on the inward stroke and to supply fluid on the outward stroke, the passages 168, 170, 172 and 174 and the port extensions 164 are provided. Thus as each port 76 is about to leave one of the ports 162, the port extension 164 opens to the passage 168, for example. If the piston happens to be on its inward stroke at this instant, fluid is discharged into the cylinder 178 and accumulates there by displacement of the piston 180.

Shortly after this port extension 164 leaves the passage 168, another port extension 164 connects to the passage 170 90° away. The corresponding piston is on its outward stroke so that the fluid stored in the cylinder 178 is delivered through the passage 176 to supply the void which would otherwise be created while the port 76 crosses from one port 162 to the next. A similar action takes place at the passages 172 and 174. In this manner the fluid impact and cavitation effects which have heretofore prevented the successful use of displacement variation by changing the phase between valve action and piston strokes are avoided.

The pistons 80 are moved outwardly by centrifugal force. In addition to this force, they may be further urged to follow the oval track 88 by maintaining a small positive pressure on the low pressure of the unit. For this purpose the pump 44 withdraws fluid from the sump 54 and delivers it through the passages 62 and 126 to the groove 130 where it enters the proper pair of ports 162 through one or the other of the replenishing valves 188. In this way the active part of the system is constantly replenished with oil from the sump without requiring that the entire case be filled with oil.

It will be seen that end cap 100 carries not only the entire fluid motor but the valve plate also. If it is desired to assemble a transmission unit for use where the maximum output is greater than or less than the motor speed, the same parts including the valve plate 110 and all parts to the right thereof in Fig. 1 may be assembled to a different end plate 100 containing a fluid motor of a different displacement than the pump 68. Likewise, by the substitution of a fixed valve plate 200 in place of the end plate 110 having pipe connections 202 connecting to the ports 162 as illustrated in Figs. 6 and 7, a variable displacement motor driven pump may be provided using the same parts which go to make up the unit illustrated in Fig. 1. The valve plate 200 may be provided with a fixed stud 204 which cooperates with the bore 64 in a manner analogous to the portion 124 of shaft 104.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device the combination of two relatively rotatable members, means forming an expansible chamber in one member, motion converting means for expanding and contracting said chambers in response to relative rotation of said members, means forming an inlet and an outlet passage in the other member, said members each having a flat face in abutting relation with each other and containing ports communicating respectively with the expansible chamber and to the inlet and outlet passages, a pressure plate having a flat face, a flat face on the one member abutting the flat face of the pressure plate and having a pressure balancing port communicating with the expansible chamber and of equal area and directly opposed to the other port in the one member, helical means for causing the pressure plate to move axially toward the one member upon rotation of the plate in one direction, and means for urging the plate to rotate in that direction.

2. In a fluid pressure energy translating device the combination of two relatively rotatable members, means forming an expansible chamber in one member, motion converting means for expanding and contracting said chambers in response to relative rotation of said members, means forming an inlet and an outlet passage in the other member, said members each having a flat face in abutting relation with each other and containing ports communicating respectively with the expansible chamber and to the inlet and outlet passages, a pressure plate having a flat face, a flat face on the one member abutting the flat face of the pressure plate and having a pressure balancing port communicating with the expansible chamber and of equal area and directly opposed to the other port in the one member, helical means for causing the pressure plate to move axially toward the one member upon rotation of the plate in one direction, and resilient means for urging the plate in that direction.

3. In a hydraulic variable speed transmission the combination of two fluid pressure energy translating devices, each comprising a member having an expansible chamber therein and means for variably expanding and contracting said chamber, a single member disposed between said members having an inlet and an outlet passage connecting said translating devices, means mounting the members for relative rotation of the two expansible chamber members and the other member and permitting slight axial movement of all of the members toward and away from one another, said members having flat faces in abutting relation and containing ports leading respectively to the expansible chamber and to the inlet and outlet passages, and means for urging said flat faces into contact to maintain a substantially constant frictional drag between the faces.

4. In a hydraulic variable speed transmission the combination of two fluid pressure energy translating devices, each comprising a member having an expansible chamber therein and means for variably expanding and contracting said chamber, a single member disposed between said members having an inlet and an outlet passage connecting said translating devices, means mounting the members for relative rotation of the two expansible chamber members and the other member and permitting slight axial movement of all of the members toward and away from one another, said members having flat faces in abutting relation and containing ports leading respectively to the expansible chamber and to the inlet and outlet passages, and a single means for urging all of said flat faces into fluid sealing engagement.

5. In a fluid pressure energy translating device the combination of a cylinder member having a plurality of open-ended radial bores, pistons reciprocable in said bores, a race member having a substantially oval race thereon for reciprocating said pistons, means mounting said members for rotation of one relative to the other, a valve member associated with the race member and having two pairs of inlet and outlet ports, a port in the cylinder member connecting to each bore and cooperating with said inlet and outlet ports, means for varying the phase relation between the race member and the valve member for varying the net displacement of the device, and means providing for the supply and discharge of fluid to and from said bores during the interval of transfer from an inlet to an outlet port and vice versa.

6. In a fluid pressure energy translating device the combination of a cylinder member having a plurality of open-ended radial bores, pistons reciprocable in said bores, a race member having a substantially oval race thereon for reciprocating said pistons, means mounting said members for rotation of one relative to the other, a valve member associated with the race member and having two pairs of inlet and outlet ports, a port in the cylinder member connecting to each bore and cooperating with said inlet and outlet ports, means for varying the phase relation between the race member and the valve member for varying the net displacement of the device, and means including an accumulator providing for the supply and discharge of fluid to and from said bores during the interval of transfer from an inlet to an outlet port and vice versa.

7. In a variable speed power unit the combination of an electric motor, a pump, a fluid motor, said pump and electric motor being supported in a common casing member, a valve member provided with a set of inlet and outlet ports for the pump and with a set of inlet and outlet ports for the fluid motor and with passages connecting said sets of ports, and a second casing member for supporting the fluid motor and the valve member, said second casing member, fluid motor and valve member being removable as a unit and replaceable by a different casing member including a valve member for the pump and piping connections to provide a motor-pump unit.

8. In a variable speed power unit the combination of an electric motor, a pump, a fluid motor, said pump and electric motor being supported in a common casing member, said electric motor including an annular winding near the outer periphery thereof, a valve member provided with a set of inlet and outlet ports for the pump and with a set of inlet and outlet ports for the fluid motor and with passages connecting said sets of ports, and a second casing member for supporting the fluid motor and the valve member, said pump having a portion extending axially toward the motor and radially within said annular winding.

9. In a variable speed power unit the combination of an electric motor, a pump, a fluid motor, said pump, fluid motor, and electric motor being supported in a common casing member, said electric motor including an annular winding near the outer periphery thereof, said pump having a portion extending axially toward the motor and radially within said annular winding.

RALPH L. TWEEDALE.